United States Patent
Madour et al.

(10) Patent No.: US 6,907,016 B2
(45) Date of Patent: Jun. 14, 2005

(54) MOBILE IP REGISTRATION IN SELECTED INTER-PDSN DORMANT HAND-OFF CASES IN A CDMA2000-BASED CELLULAR TELECOMMUNICATIONS NETWORK

(75) Inventors: Lila Madour, Kirkland (CA); Karim Shafik, Dollard-des-Ormeaux (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 842 days.

(21) Appl. No.: 09/823,974

(22) Filed: Apr. 3, 2001

(65) Prior Publication Data

US 2002/0141361 A1 Oct. 3, 2002

(51) Int. Cl.$^7$ ................................................. H04Q 7/00
(52) U.S. Cl. .......................... 370/331; 370/336; 455/436
(58) Field of Search ................................. 370/310, 328, 370/331–6, 342, 351–4, 441, 469; 455/422, 436–460

(56) References Cited

U.S. PATENT DOCUMENTS

| | | | | |
|---|---|---|---|---|
| 6,708,031 B2 | * | 3/2004 | Purnadi et al. | 455/436 |
| 2002/0048266 A1 | * | 4/2002 | Choi et al. | 370/331 |
| 2002/0068565 A1 | * | 6/2002 | Pumadi et al. | 455/436 |
| 2004/0214574 A1 | * | 10/2004 | Eyuboglu et al. | 455/439 |

FOREIGN PATENT DOCUMENTS

WO  WO 00/05909  2/2000

* cited by examiner

*Primary Examiner*—David Vincent
(74) *Attorney, Agent, or Firm*—Jenkens & Gilchrist, P.C.

(57) ABSTRACT

In a cellular telecommunications network, a method and system for performing dormant hand-off for a dormant Mobile Node (MN) between a source packet zone an a target packet zone, when the MN still has an active A10 and Point-to Point Protocol (PPP) connection in the target packet zone. According to the method, when handed-off, the MN issues an origination request with a Data Ready to Sent (DRS) parameter set to zero for the target Base Station Controller (BSC-T) which responsive to the request further sends an A9-setup-A8 registration request to a target Packet Control Function (PCF-T). The PCF-T then sends an A-11 Registration Request message to a Packet Data Service Node (PDSN-T) of the target packet zone. Responsive to the receipt of the Registration request, the PDSN-T sends an agent advertisement message to the MN and initiates the Mobile IP (MIP) registration procedure, and the MN can register the care-of-address information relating to the new serving PDSN, the PDSN-T, with its Home Agent (HA). According to another embodiment, the same method is to be used for performing a hand-off of the dormant MN to the target packet zone, when the MN, before issuing the origination request, demands the activation of a packet data session.

20 Claims, 1 Drawing Sheet

MOBILE IP REGISTRATION IN SELECTED INTER-PDSN DORMANT HAND-OFF CASES IN A CDMA2000-BASED CELLULAR TELECOMMUNICATIONS NETWORK

BACKGROUND OF THE INVENTION

1. Field of the Invention

The present invention relates to packet-data cellular telecommunications, particularly to a method and system for Mobile IP Registration (MIP) of a Mobile Node during a dormant hand-off in a CDMA 2000 packet-data cellular telecommunications network.

2. Description of the Related Art

The CDMA 2000 cellular telecommunications network is a third generation (3G) cellular telecommunications network that uses the Code Division Multiple Access (CDMA) radio access technology for providing high-speed wireless service to mobile stations (MS). The services include two-way transmission of voice, text, multimedia applications, and movies, as well as internet access.

An exemplary IP-based CDMA 2000 cellular telecommunications network includes a plurality of mobile stations herein designated as Mobile Nodes (MNs) communicating over a radio interface with Base Transceiver Stations (BTS). Each group of one or more BTSs is connected to, and controlled by a Base Station Controller (BSC), while each group of BSCs of one particular packet zone are controlled by one Packet Control Function (PCF), which purpose is to manage the access network connectivity to the PDSN for 3G packet data services. Thus, typically, a given BSC can only be serviced by a given PCF. One or more Mobile Switching Centers (MSCs) may be connected to the CDMA 2000 cellular packet data telecommunications network for the provision of cellular service to subscribers and for mobility management (authentication and traffic channel assignments), while a Packet Data Service Node (PDSN) performs the switching and routing functions directed to the packet data communications within the CDMA 2000 cellular telecommunications network, and the logical support and assignment of IP-based (packet data) services.

The CDMA 2000 packet-data cellular telecommunications network provides Mobile IP service to packet mobile users as described in the standard "Wireless IP Standard IS-835", herein included by reference. Mobile IP service is provided over a Point-to-Point Protocol (PPP) connection between the MN and the PDSN. When a PPP connection is established, negotiation messages are exchanged between the MN and the PDSN with regards to authentication and compression, followed by the MN's Mobile IP (MIP) registration. Thereafter, data may be sent from and to the MN, such as for example during a file download. However, the MN becomes dormant when no data is transmitted for a certain period of time over the PPP connection. In instances when the MN is dormant, there is no traffic channel assigned for the MN, although the PPP connection is maintained in both the MN and the PDSN.

When a dormant MN moves within the packet data service area, instances arise when the MN is handed-off, from a first packet zone to a second packet zone. However, in the source packet zone, the original PPP connection is maintained in both the PDSN and the MN for a predefined period of time even after the MN is handed-off to the target packet zone. When the dormant MN moves from one packet zone to another, the MN notifies the access network, and a Packet Control Function (PCF) within the access network attempts to select a PDSN for the MN. The goal is to try to select the same PDSN where a PPP session is maintained for the mobile IP user. However, oftentimes, depending upon the network configuration, the result of the selection will not be the same PDSN, and the MN could end up being handed-off to a PDSN which already holds an unexpired PPP connection and an unexpired MIP registration for that MN. In such a case, the standard version IOS V. 4.0 stipulates that A11 registration procedures shall not be performed since both the PDSN and PCF already have an active A10 physical connection between the BSC/PCF and the PDSN (the A10 physical connection being also called herein a Radio network Packet data serving node session or connection, (RP connection)). However, in the current implementations compliant with the existing standard, in such a scenario the Home Agent (HA) fails to be updated with the new care-of-address containing the serving PDSN identification, which results in data from the MN being sent to the wrong PDSN, i.e. to the source PDSN.

The same problem arises in cases wherein the situation is further complicated by the likelihood that while performing a dormant hand-off between different PDSNs, the MN could suddenly request reactivation of the packet data call before issuing an origination request indicating that it is performing dormant mobility. Should this scenario occur, there is no way for the system to recognize that the transaction is effectively, at first, a dormant mobility event. Thus, no agent advertisement is sent, which results in temporary loss of data in the downstream direction.

It would be advantageous to have a method that solves the above-identified deficiency. In particular, there is an advantage to have a simple and straightforward method that on one hand, takes advantage of the existing features of the CDMA2000, and on the other hand modifies the existing standard, for allowing the proper PDSN to be registered with the Home Agent in cases of dormant mobility events.

SUMMARY OF THE INVENTION

It is therefore an object of the present invention to provide in a CDMA-based cellular telecommunications network, a method for performing a dormant hand-off for a dormant Mobile Node (MN) from a source packet zone to a target packet zone, wherein the MN has an active A10 connection and an active PPP connection with a target PDSN of the target packet zone, the method first issuing from the dormant MN an origination request for the target packet zone. Then, responsive to the origination request, an A-11 Radio network Packet data serving node (RP) registration request is sent from a target Packet Control Function (PCF-T) to the target PDSN, wherein the A-11/RP registration request comprises a mobility indicator indicative that the MN is performing a dormant hand-off. Responsive to the receipt of the registration request, the target PDSN initiates a Mobile IP registration procedure.

It is another object of the present invention to provide a similar method for performing a hand-off of the dormant MN to the target packet zone, when the MN, before issuing the origination request, demands the activation of a packet data session.

It is yet another object of the present invention to provide a CDMA-based cellular telecommunications system comprising i) a dormant Mobile Node (MN), ii) a target packet zone having i) a target Packet Data Service Node (PDSN) with which the MN has an active A10 connection and ii) an active PPP connection and a target Packet Control Function (PCF), and iii) a source packet zone having a source PDSN with which the MN is currently registered with, wherein the MN issues an origination request for the target packet zone during a hand-off procedure from the source packet zone to the target packet zone, and responsive to the origination request, the target PCF sends an A-11 Radio network Packet data serving node (RP) registration request to the target PDSN for the MN, the A-11/RP registration request comprising a mobility indicator indicating that the MN is performing a dormant hand-off, and responsive to the receipt of the registration request the target PDSN initiates a Mobile IP registration procedure.

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION OF THE PREFERRED EMBODIMENTS

Figure 1:
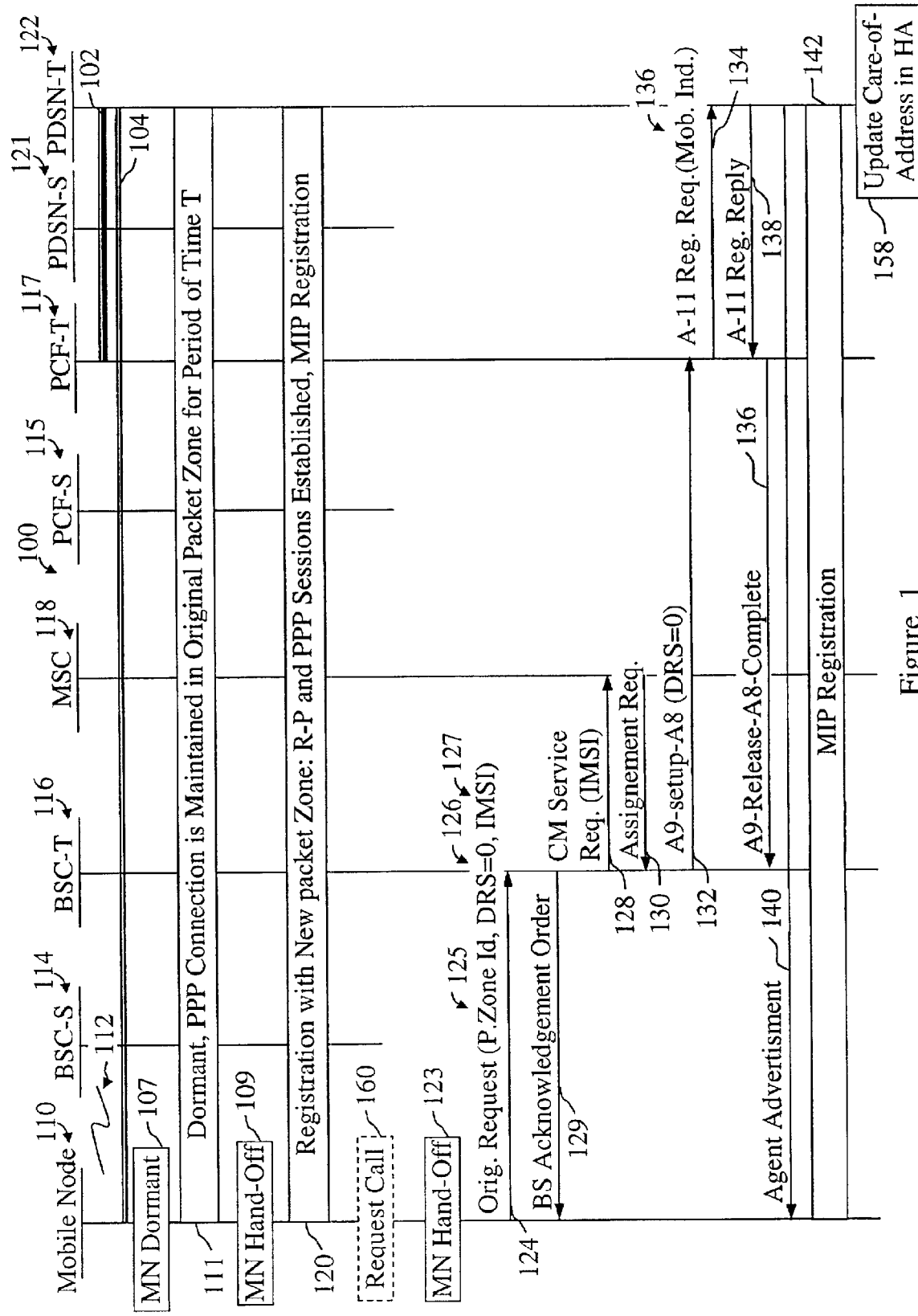
FIG. 1 is an exemplary nodal operation and signal flow diagram illustrating the preferred embodiment of the invention.

Reference is now made to FIG. 1, wherein there is shown a nodal operation and signal flow diagram illustrative of the preferred embodiment of the invention. Shown in FIG. 1 is a CDMA 2000 packet data cellular telecommunications network 100 comprising at least one Mobile Node (MN) 110, communicating over an air (radio) interface 112, and via a plurality of Base Transceiver Stations (BTSs, not shown) with a plurality of Base Station Controllers (BSCs), such as for example BSCs 114 and 116. The BSCs 14 and 116 are typically each served by one Packet Control Function (PCF) 115 and 117 respectively, which purpose is to interface to the PDSN for 3G packet data services such as for example, but not limited to data buffering and RP interface management. The network 100 may further comprise at least one Mobile Switching Center (MSC) 118 and a plurality of Packet Data Service Nodes (PDSNs), such as for example a PDSN-S 121 and PDSN-T 122.

For the purpose of understanding the present invention, it is assumed that originally, the MN 110 is serviced and provided with a data transfer session in a first packet zone by the PDSN-Target (PDSN-T) 122, through an A10 (R-P) connection 102 between the PDSN-T 122 and the PCF-T 115, and an established PPP session 104 between the PDSN-T 122 and the MN 110. Therefore, it is also assumed that the MN 110 performed a successful MIP registration with the PDSN-T 122. At one later point in time, the MN 110 becomes dormant, action 107. By dormant MN, it is meant an MN that previously established a Point-to-Point Protocol session with a PDSN, in the present example with PDSN-T 122, but that does not exchange data over that connection for a given period of time, thus causing the traffic channel (not shown) between itself and the serving BSC (here BSC-T) 122 to be dropped, while the PPP connection is being kept active, action 111, for a predetermined period of time T in both the MN and the PDSN-S 122. The MN 110 may further move (be handed-off), action 109 from the first packet zone, wherein it was served by PDSN-T 122, to a second packet zone, wherein it is served by the PDSN-S 120. Therefore, when the MN 110 crosses the packet zone boundary at dormant state and goes into the packet zone served by PDSN-S 121, the PPP connection previously established with the PDSN-T 122 is kept in the MN and the PDSN-T 122 for period of time T, as mentioned in action 111. The period of time T may be any one or the other, or the shortest period of time from, a PPP connection expiration time T1 and an RP connection expiration time T2.

When the MS 110 enters the second packet zone, it must register with the new serving packet zone, action 120. For that purpose, it contacts the PCF-Source (PCF-S) 113, which in the present example selects PDSN-S 121 to service MN 110. Thus, the new serving BSC-S 114 associated with PCF-S, sends an origination request to PCF-S 113 indicating a dormant mobility event. An A-11 (RP) registration request is sent by PCF-S 113 to PDSN-S 121 for transmitting the information related to the mobility event. PDSN-S 121 recognises that it does not currently host an active PPP session for MN 110, and therefore starts the PPP session establishment procedures. Following the establishment of the PPP session between the MN 110 and the PDSN-S 121, the former sends an agent advertisement to the MN 110 to prompt MIP registration for the MN. At this point, following the MIP registration of the MN 110 with the PDSN-S 121, the MN can obtain packet-data service from the PDSN-S 121.

However, instances occur when the MN 110 at dormant state comes back into the original packet zone serviced by PDSN-T 122 before the expiry of the period of time T, i.e. before the expiry of the PPP and MIP timers set in PDSN-T 122 for the RP connection 102 and the PPP session 104 with the MN 110 are still active, action 123. According to the first preferred embodiment of the invention, in such a scenario, the MN 110 sends an origination request message 124 to the BSC-Target (BSC-T) 116 via a BTS (not shown), for requesting service from the original packet zone. The origination request message 124 comprises a Packet Zone Identification parameter 125 indicative of the new packet zone the MN 110 is trying to register with, an indication 126 to the effect of that the MN 110 is dormant (no current data transfer is taking place), and an identification 127 of the MN 110 itself, preferably under the form of an International Mobile Station Identification (IMSI). The indication 126 may comprise the parameter Data Ready to Sent (DRS) set to zero (0), DRS=0, that indicate to the network that the MN 110 is dormant since it is sending no data. Responsive to the receipt of the origination request message 124, the BSC-T 116 replies back to the MN 110 through a BS acknowledgement order message 129, for confirming that it accepts to serve the MN 110. The BSC 116 may further exchange with the serving MSC 118 serving set up messages 128 and 130, through which the MSC 118 is requested, and accepts, to support cellular service for the MN 110, as it is known in the art. The BSC-T 116 then sends an origination message 132 to the PCF-T 117 under the form of an A9-Connect-A8 message for indicating that a dormant mobility event is taking place for MN 110. The message 132 may contain for that purpose a parameter Data Ready to Sent (DRS) set to zero indicating that the MN has no data to sent, i.e. it is dormant. According to the first preferred embodiment of the present invention, and as a modification to the current specifications of the standard IOS V. 4.0, upon receipt of the A9-Connect-A8 message, the PCF-T 117 sends an A-11 Registration Request 134 to the PDSN-T 122, although an active A-10 (RP) connection 102 already exists between the PCF-T 117 and the PDSN-T 122 for MN 110. The A-11 Registration Request 134 preferably comprises a mobility indicator 136 indicative of the fact the MN 110 is performing a hand-off to the PDSN 122. The PDSN-T 122 responds back with an A-11 Registration Reply 138 to the PCF-T 117, which in turn replies back to the BSC-T 116 for confirming the request for service to the PDSN-T.

Responsive to the A-11 Registration Request 134, the PDSN-T 122 sends an Agent Advertisement message 140 to the MN 110, and thus initiates a new MIP registration procedure 142 with the MN 110, through which the MN 110 can update its care of address information with the Home Agent (HA) 150 to reflect the fact that it is now served by PDSN-T 122, action 158.

According to the second preferred embodiment of the invention, the MN 110, while it performs the hand-off 123 and comes back to the original packet zone as described hereinbefore with reference to FIG. 1, also requests reactivation of a packet-data session before issuing the origination request 124.

With the existing standard requirement, in such situation, there is no way for the system to recognise that the transaction is effectively, at first, a dormant hand-off (since MN 110 was dormant in the former packet zone and requests packet-data service only in the target packet-zone), and therefore no agent advertisement is sent until an agent solicitation is issued by the MN, which may be only following a substantial amount of time. This situation oftentimes result in loss of data.

According to the second preferred embodiment of the invention destined to correct the aforementioned deficiencies of the existing standard requirements, in cases wherein the MN 110, while performing the hand-off 123 also requests reactivation of a packet-data session, action 160, shown in dotted lines, before issuing the origination request 124, the same method as described hereinabove will be applied, although the MN has data to be sent, and that according to the standard IOS V. 4.0, the DRS parameter 126 should have been set to 1 (DRS=1). Therefore, according to the second preferred embodiment, when the MN 110 requests the activation of a packet-data session (MN has data to be sent), the MN 118 issues the same origination request message with the DRS parameter still set to 0. The method will proceed as described hereinbefore, and following the MIP registration of step 142, the PDSN-T 122 updates the home agent with the new care-of-address information, action 158, and a traffic channel is established between the MN 110 and the BSC-T 116, action not shown, as described in the standard IOS V 4.0., thus allowing the MN 110 to be able to transmit the required data.

Although several preferred embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. In a CDMA-based cellular telecommunications network, a method for performing a dormant hand-off for a dormant Mobile Node (MN) from a source packet zone to a target packet zone, wherein the MN has an active A10 connection and an active PPP connection with a target PDSN of the target packet zone, the method comprising the steps of:

while the MN has an active A10 connection and an active PPP connection with a target PDSN of the target packet zone, issuing from the dormant MN an origination request for the target packet zone;

responsive to the origination request, sending an A-11 Radio network Packet data serving node (RP) registration request from a target Packet Control Function (PCF-T) to the target PDSN for the MN, the A-11/RP registration request comprising a mobility indicator indicative that the MN is performing a dormant hand-off; and responsive to the receipt of the registration request, initiating a Mobile IP registration procedure.

2. The method claimed in claim 1, further comprising responsive to the step of initiating a Mobile IP registration procedure, the step of:

updating a Home Agent (HA) of the MN with a care-of-address information relating to the MN.

3. The method claimed in claim 1, wherein the step of initiating a Mobile IP registration procedure comprises the step of:

sending an agent advertisement message from the PDSN to the MN.

4. The method claimed in claim 1, wherein the step of issuing from the dormant MN an origination request for the target packet zone comprises the steps of:

sending from the MN the origination request comprising a target packet zone identification, a Data Ready to Sent parameter set to zero indicative of a dormant state of the MN, and an identification of the MN; and receiving the origination request in a target Base Station Controller (BSC-T).

5. The method claimed in claim 4, further comprising before the step of sending the A-11 registration request, the step of:

responsive to a receipt of the origination request by the BSC-T, sending from the BSC-T an A9-setup-A8 message to the PCF-T, the A9-setup-A8 message comprising the Data Ready to Sent parameter set to zero.

6. The method claimed in claim 1, 4, or 5, wherein the MN requests an activation of a data packet session before issuing the origination request for the target packet zone.

7. The method claimed in claim 1, further comprising before the step of issuing, the steps of:

handing-off the MN from the target packet zone to the source packet zone, wherein the A10 connection and the PPP connection with a target PDSN are kept active for a predetermined period of time;

registering the MN with the source packet zone;

handing over from the source packet zone to the target packet zone the dormant MN before the expiry of the predetermined period of time.

8. The method claimed in claim 1, wherein the step of issuing is performed before an expiry of a predetermined period of time.

9. The method claimed in claim 8, wherein the predetermined period of time is one of a PPP connection expiration time and an RP connection expiration time.

10. The method claimed in claim 9, wherein the predetermined period of time is the shortest period of time from a PPP connection expiration time and an RP connection expiration time.

11. A CDMA-based cellular telecommunications system comprising:

a dormant Mobile Node (MN);

a target packet zone having i) a target Packet Data Service Node (PDSN) with which the MN has an active A10 connection and ii) an active PPP connection and a target Packet Control Function (PCF); and a source packet zone having a source PDSN with which the MN is currently registered with;

wherein the MN issues an origination request for the target packet zone during a hand-off procedure from the source packet zone to the target packet zone, and responsive to the origination request, the target PCF sends an A-11 Radio network Packet data serving node (RP) registration request to the target PDSN for the MN, the A-11/RP registration request comprising a mobility indicator indicating that the MN is performing a dormant hand-off, and responsive to the receipt of the registration request the target PDSN initiates a Mobile IP registration procedure.

12. The system claimed in claim 11, wherein responsive to initiating a Mobile IP registration procedure, a Home Agent (HA) of the MN is updated with a care-of-address information relating to the MN.

13. The system claimed in claim 11, wherein during the Mobile IP registration procedure the PDSN sends an agent advertisement message to the MN.

14. The system claimed in claim 11, wherein the origination request for the target packet zone is sent by the MN to a target Base Station Controller (BSC-T) and comprises a target packet zone identification, a Data Ready to Sent parameter set to zero indicative of a dormant state of the MN, and an identification of the MN.

15. The system claimed in claim 14, wherein before sending the A-11 registration request and responsive to a receipt of the origination request by the BSC-T, the BSC-T sends an A9-setup-A8 message to the PCF-T, the A9-setup-A8 message comprising the Data Ready to Sent parameter set to zero.

16. The system claimed in claim 11, 14, or 15, wherein the MN requests an activation of a data packet session before issuing the origination request for the target packet zone.

17. The system claimed in claim 11, wherein:

the MN is handed-off from the target packet zone to the source packet zone, while the A10 connection and the PPP connection with a target PDSN are kept active for a predetermined period of time, the MN registers with the source packet zone, and the dormant MN is handed over from the source packet zone to the target packet zone before the expiry of the predetermined period of time.

18. The system claimed in claim 11, wherein the issuance of the origination request for the target packet zone is performed before an expiry of a predetermined period of time.

19. The system claimed in claim 18, wherein the predetermined period of time is one of a PPP connection expiration time and an RP connection expiration time.

20. The system claimed in claim 19, wherein the predetermined period of time is the shortest period of time from a PPP connection expiration time and an RP connection expiration time.

* * * * *